April 28, 1931.                T. A. WILLARD                1,802,801
                              STORAGE BATTERY
                            Filed March 12, 1924
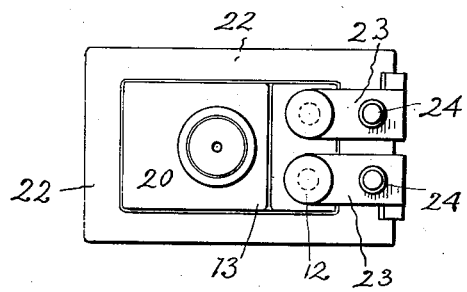
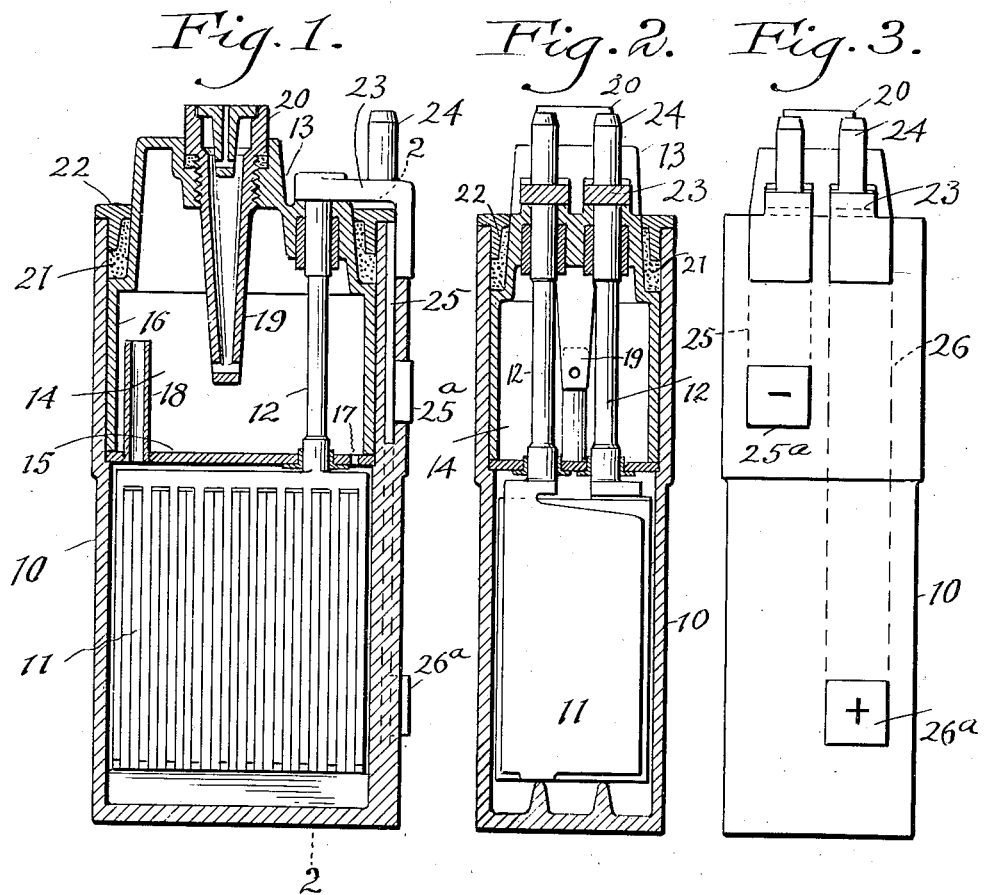

Patented Apr. 28, 1931

1,802,801

UNITED STATES PATENT OFFICE

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA

STORAGE BATTERY

Application filed March 12, 1924. Serial No. 698,614.

This invention relates to storage batteries and has particular reference to small portable batteries.

One of the objects is to provide a battery which is light in weight, and which may be used advantageously in connection with certain kinds of portable apparatus such as a motion picture camera, in which event the battery may be used for supplying current to a motor for cranking the camera. It is to be understood, however, that my improved battery is not confined to this or any other particular apparatus.

A further object is to provide a battery having improved means for making charging connections preferably independently of the terminals or terminal portions through which connections are normally made when current is drawn from the battery.

A further object is to provide certain improvements in a battery of the type which may be inverted or turned from normal position without danger of spilling the electrolyte, the latter improvement pertaining particularly to the form and construction of the cover of the container.

The invention may be briefly summarized as consisting in certain novel details of construction, and combinations and arrangements of parts which will be described in the specification and pointed out in the appended claims.

In the accompanying sheet of drawings showing the preferred embodiment of my invention, Fig. 1 is a vertical sectional view of my improved battery; Fig. 2 is a vertical sectional view substantially along the line 2—2 of Fig. 1; Fig. 3 is a side elevation looking toward the left of Fig. 1; and Fig. 4 is a top plan view.

Referring now to the drawings, my improved battery in this instance comprises a single cell having a container 10 which may be formed of hard rubber or any other suitable material. The container is provided with the usual battery element 11, consisting of the positive and negative plates and separators, the two groups of plates having terminal posts 12 which extend up through the cover 13 to be referred to.

Above the plates there is an acid space 14 adapted to receive without spillage the acid or electrolyte in the event the battery is turned upside down. This acid space is formed between the cover 13 and a diaphragm 15 which is just above the plates, the cover 13 having a skirt-like extension 16 which fits down inside the container, and at its bottom edge engages this diaphragm. This construction is not claimed herein as it constitutes the subject matter of my prior Patent No. 1,327,650, granted January 13, 1920.

As is customary in invertible batteries of this kind having a lower compartment which receives the plates and normally holds the electrolyte, and an upper compartment which receives the electrolyte when the battery is inverted, the diaphragm has at one side an opening 17 and at the other side an upstanding tube 18 communicating with the lower compartment, and the cover has a downwardly extending tube 19 with an opening at its lower end, this tube in this instance forming a part of the vent plug 20 which is designed to be removed to supply the electrolyte.

Coming now more particularly to the features involving my invention, it will be observed that the two terminal posts 12 extend through the cover, not near opposite ends thereof as is customary in storage battery construction, but side by side near one end, or on one side of the transverse center plane of the battery. Additionally it will be observed that these posts extend through a relatively depressed part of the cover 13, and the remainder of the cover, including the part carrying the vent plug 20 is relatively elevated. This arrangement provides additional acid space without elevating too high or bringing to too high a level the terminal posts.

As a further improvement in the cover, it will be observed that where the cover extends down into the container, it is offset inwardly, as is customary in battery construction, to form a space for the sealing compound 21. In the present instance I provide a second cover 22 in the form of a collar, in this case rectangular in form, which fits around that portion of the cover 13 extending up above the top of the container 10, and which is flanged so as to extend over the edge of the container 10 and to extend down into the container 10, or into the sealing compound. Thus this auxiliary cover, which preferably extends all around the margin of the container, completely covers the sealing compound 21.

Further novel features reside in the provision which is made for connecting the terminal posts to charging and discharging circuits. It will be observed that the upper ends of the posts are connected preferably by lead-burning to terminal connectors 23. These connectors are substantially L-shaped, and they extend over the cover, including the auxiliary cover 22, to the end of the container, then down along one end of the container, as best shown in Figs. 1 and 3. From the upper or horizontal portions of the connectors 23, two posts 24 project upwardly. These posts form terminals for the charging circuit. It will be noted that the end of the container over which the terminals 23 project, is somewhat thicker than the opposite end of the container. Into this thickened end of the container there are embedded two strips 25 and 26, which are preferably of lead. The upper ends of these strips are lead-burned to the overhanging or downwardly projecting portions of the terminals 23, the lower ends of the terminals 23 extending into notches in the ends of the container where the upper ends of the strips 25 are exposed. The two strips 25 and 26 extend down, and they have terminal portions 25a and 26a which protrude through the end wall of the container. These terminal portions 25a and 26a form the terminals to which the discharging or working circuit is adapted to be connected. They are preferably formed of copper pieces which are seated in openings in the end wall of the case where the lower ends of the strips 25 and 26 are exposed, and are swetted to the latter. In the embodiment shown, the two terminals 25a and 26a of the work circuit are at different elevations, one being near the bottom of the container and the other much nearer the top. They might, however, be at the same elevation or at different relative heights than shown, the present arrangement being utilized as a matter of convenience for making the necessary electrical connections with a particular form of apparatus, i. e. with the motor circuit of a motion picture camera, in which event, one terminal or contact is adapted to be engaged by a switch in the motor circuit, while the other is adapted to be grounded on the camera case.

When the battery is used for the purpose stated, it must be small and light in weight, and as the voltage is necessarily low, good contact is required in connecting the battery to the work circuit, and loss of voltage where the motor circuit is connected to the battery must be avoided. These advantages are gained with this battery having separate terminals for the charging and work circuits, and having the terminals for the work circuit in the form of copper contacts.

Having described my invention, I claim:

1. In a storage battery of the invertible type having a plate compartment and an acid compartment above the same, a cover for the container, and terminal posts extending from the plate compartment up through the cover, the latter having a relatively depressed part at one end thereof through which the terminal posts project.

2. In a storage battery, a container having a cover extending into the container and inset from the top portion thereof to form a space for sealing compound, and an auxiliary cover extending about the margin of the container and having an opening through which said first mentioned cover projects.

3. In a storage battery, a container having a cover which stands up above the top of the container and extends down into the latter, a portion of the cover in the container being offset from the walls of the latter to form a space for sealing compound, and an auxiliary cover in the form of a collar fitted over the top of the container and around the portion of the cover projecting above the top of the container.

4. In a storage battery of the invertible type having a plate compartment and an acid compartment above the same, a cover for the container having the major portion thereof elevated and having a depressed portion at one end thereof, a vent plug in the elevated portion of the cover, and a pair of terminal posts extending side by side from the plate compartment through the depressed portion of the cover.

In testimony whereof, I hereunto affix my signature.

THEODORE A. WILLARD.